US011188566B2

(12) United States Patent
Harrington et al.

(10) Patent No.: US 11,188,566 B2
(45) Date of Patent: Nov. 30, 2021

(54) GROUPING OF OBJECTS INTO CLUSTERS IN AN OBJECT-BASED STORAGE ENVIRONMENT

(71) Applicant: International Business Machines Corporation, Armonk, NY (US)

(72) Inventors: Shaun E. Harrington, Sahuarita, AZ (US); Benjamin K. Rawlins, Tucson, AZ (US); Ezra E. Hartz, Saddlebrook, AZ (US); Emmanuel Barajas Gonzalez, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 16/171,207

(22) Filed: Oct. 25, 2018

(65) Prior Publication Data

US 2020/0134082 A1 Apr. 30, 2020

(51) Int. Cl.
*G06F 16/00* (2019.01)
*G06F 16/28* (2019.01)
(Continued)

(52) U.S. Cl.
CPC .......... *G06F 16/285* (2019.01); *G06F 16/215* (2019.01); *G06F 16/2365* (2019.01)

(58) Field of Classification Search
CPC ... G06F 16/285; G06F 16/215; G06F 16/2365
(Continued)

(56) References Cited

U.S. PATENT DOCUMENTS

| 5,897,661 | A | * | 4/1999 | Baranovsky | .......... | G06F 3/0608 |
| | | | | | | 707/999.202 |
| 8,965,925 | B2 | * | 2/2015 | Zoellner | ............... | G06F 16/164 |
| | | | | | | 707/781 |

(Continued)

OTHER PUBLICATIONS

Bilal Khan et al., "Removing Fully and Partially Duplicated Records through K-Means Clustering", LACSIT International Journal of Engineering and Technology, vol. 4, No. 6, Dec. 2012, 5 pages.*

(Continued)

*Primary Examiner* — Monica M Pyo
(74) *Attorney, Agent, or Firm* — Zilka-Kotab, P.C.

(57) ABSTRACT

In one general embodiment, a computer-implemented method includes determining attributes of a plurality of objects in an object-based storage environment, grouping the objects into clusters based on similarities of the attributes using a clustering algorithm, storing indication of which objects are in which clusters, detecting occurrence of a trigger event associated with an object, determining to which cluster the object belongs using the clustering algorithm in response to detecting the trigger event, and performing a deduplication process for the object against other objects in the cluster to which the object belongs. In another general embodiment, a computer program product includes a computer readable storage medium having program instructions embodied therewith. The computer readable storage medium is not a transitory signal per se. The program instructions are readable and/or executable by a computer to cause the computer to perform the foregoing method.

15 Claims, 6 Drawing Sheets

(51) Int. Cl.
*G06F 16/215* (2019.01)
*G06F 16/23* (2019.01)

(58) Field of Classification Search
USPC .......................................................... 707/692
See application file for complete search history.

(56) References Cited

U.S. PATENT DOCUMENTS

| | | | |
|---|---|---|---|
| 9,116,936 B2 * | 8/2015 | Chambliss | G06F 16/1752 |
| 9,122,750 B2 * | 9/2015 | Zoellner | G06F 16/16 |
| 9,195,673 B2 | 11/2015 | Constantinescu et al. | |
| 9,202,167 B1 * | 12/2015 | Chamness | G06N 3/08 |
| 9,479,585 B1 * | 10/2016 | Jobanputra | G06F 16/188 |
| 9,582,895 B2 * | 2/2017 | Brown | G06K 9/00778 |
| 9,971,796 B2 | 5/2018 | Hamilton et al. | |
| 10,157,347 B1 * | 12/2018 | Kasturi | G06F 16/3326 |
| 2005/0240901 A1 * | 10/2005 | McKnight | G06F 9/451 |
| | | | 717/110 |
| 2012/0278321 A1 * | 11/2012 | Traub | G06F 16/3331 |
| | | | 707/736 |
| 2014/0279927 A1 | 9/2014 | Constantinescu et al. | |
| 2014/0324920 A1 | 10/2014 | Hamilton et al. | |
| 2015/0106578 A1 * | 4/2015 | Warfield | G06F 3/0631 |
| | | | 711/158 |
| 2017/0053018 A1 * | 2/2017 | Gonzalez | G06F 16/955 |
| 2017/0109340 A1 * | 4/2017 | Chen | G06F 40/247 |
| 2019/0155534 A1 * | 5/2019 | Eda | H04L 67/1097 |

OTHER PUBLICATIONS

Abdalla et al., "NoSQL: Robust and Efficient Data Management on Deduplication Process by using a mobile application," Recent Advances in Communications, 2015, pp. 274-278.

Jia, Y., "SmartDedup: Efficient and Reliable Deduplication on Object Storage System," preprint for ACM, 6 pages, retrieved on Oct. 24, 2018, from https://csc.lsu.edu/~yjia/papers/SmartDedup.pdf.

* cited by examiner

GROUPING OF OBJECTS INTO CLUSTERS IN AN OBJECT-BASED STORAGE ENVIRONMENT

BACKGROUND

The present invention relates to data deduplication, and more specifically, this invention relates to grouping of objects within clusters in an object-based storage environment for efficient data deduplication.

The concept of deduplication includes replacing duplicate chunks of data across a system with pointers to a single instance of the data, thereby avoiding the storage space required to store multiple instances of duplicate data. In traditional storage systems having deduplication capabilities, as new data is added to the storage system, the new data is compared with existing data within the storage system. If portions of the new data already exist in the storage system, the duplicate portions of data are not written to storage system; rather only the unique data is stored to storage of the storage system, and the aforementioned pointer is written in place of the duplicate portions.

For example, in corporate environments, when an email is sent by a first user to a plurality of other users, to save space in the data storage system that records and saves the email object, deduplication may include replacing duplicate copies of the sent email with pointers to a single instance of the sent email. This may prevent storage space of the system from being unnecessarily consumed with redundant copies of the same data. This in turn reduces the overall storage requirement in the system.

SUMMARY

A computer-implemented method according to one embodiment includes determining attributes of a plurality of objects in an object-based storage environment, grouping the objects into clusters based on similarities of the attributes using a clustering algorithm, storing indication of which objects are in which clusters, detecting occurrence of a trigger event associated with an object, determining to which cluster the object belongs using the clustering algorithm in response to detecting the trigger event, and performing a deduplication process for the object against other objects in the cluster to which the object belongs.

A computer program product according to another embodiment includes a computer readable storage medium having program instructions embodied therewith. The computer readable storage medium is not a transitory signal per se. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for grouping of data objects into clusters in an object-based storage environment for efficient data deduplication.

In one general embodiment, a computer-implemented method includes determining attributes of a plurality of objects in an object-based storage environment, grouping the objects into clusters based on similarities of the attributes using a clustering algorithm, storing indication of which objects are in which clusters, detecting occurrence of a trigger event associated with an object, determining to which cluster the object belongs using the clustering algorithm in response to detecting the trigger event, and performing a deduplication process for the object against other objects in the cluster to which the object belongs.

In another general embodiment, a computer program product includes a computer readable storage medium having program instructions embodied therewith. The computer readable storage medium is not a transitory signal per se. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
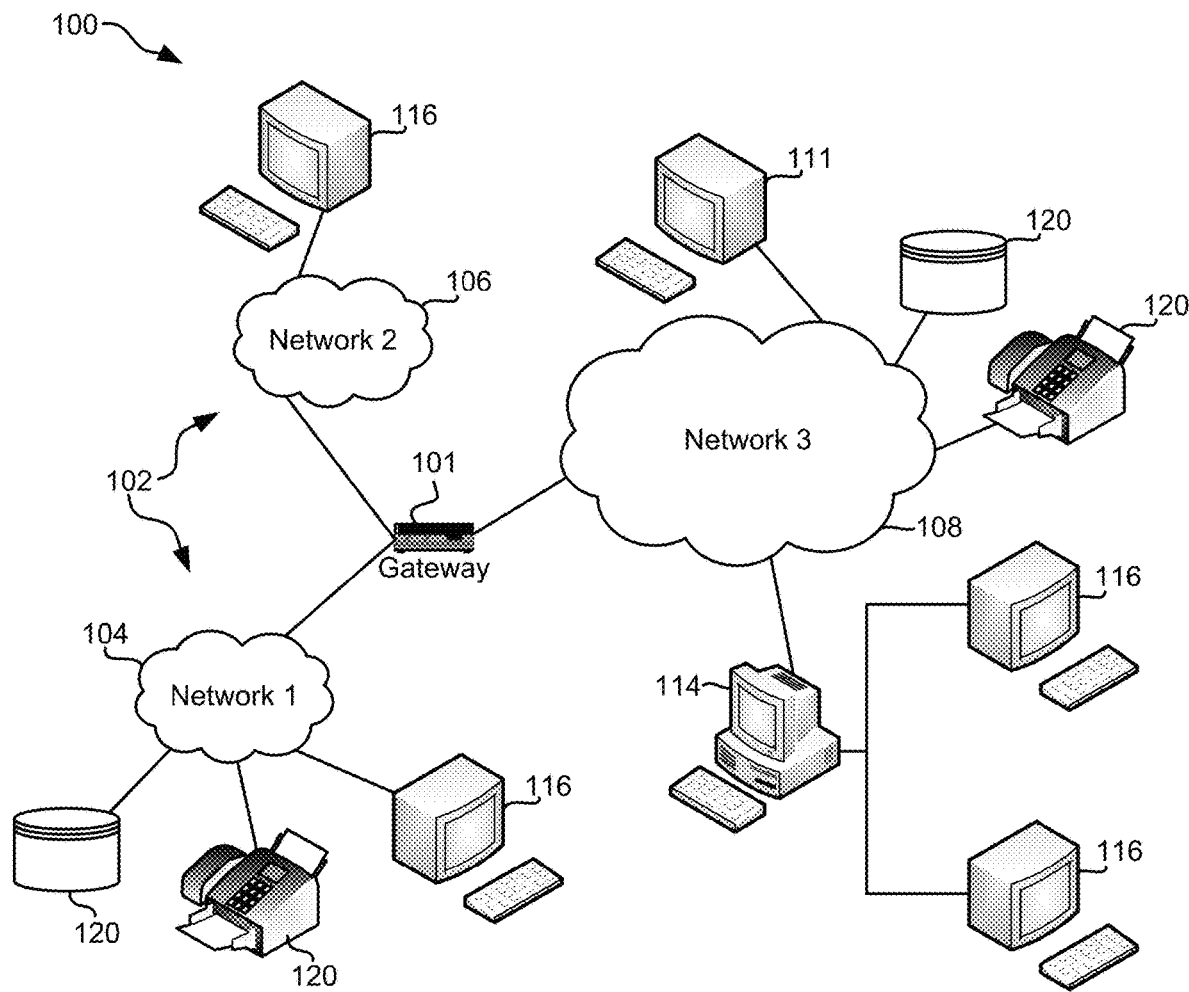
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
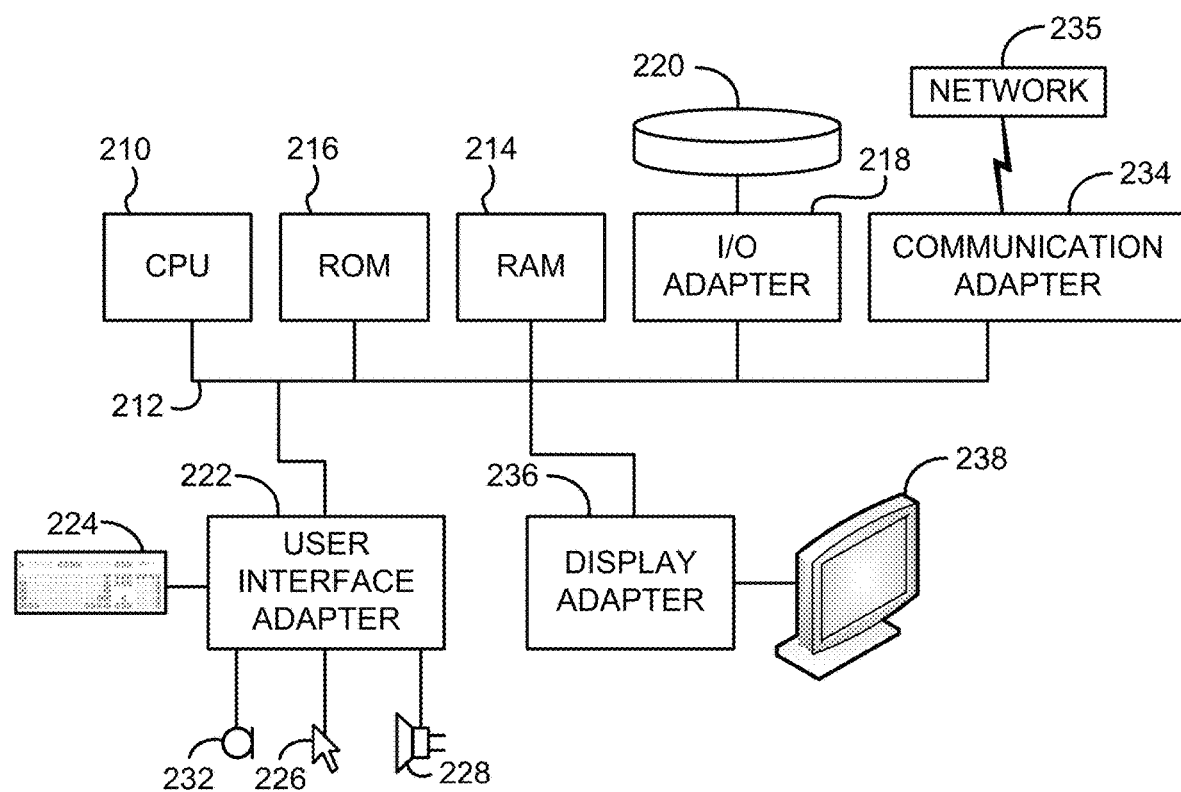
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
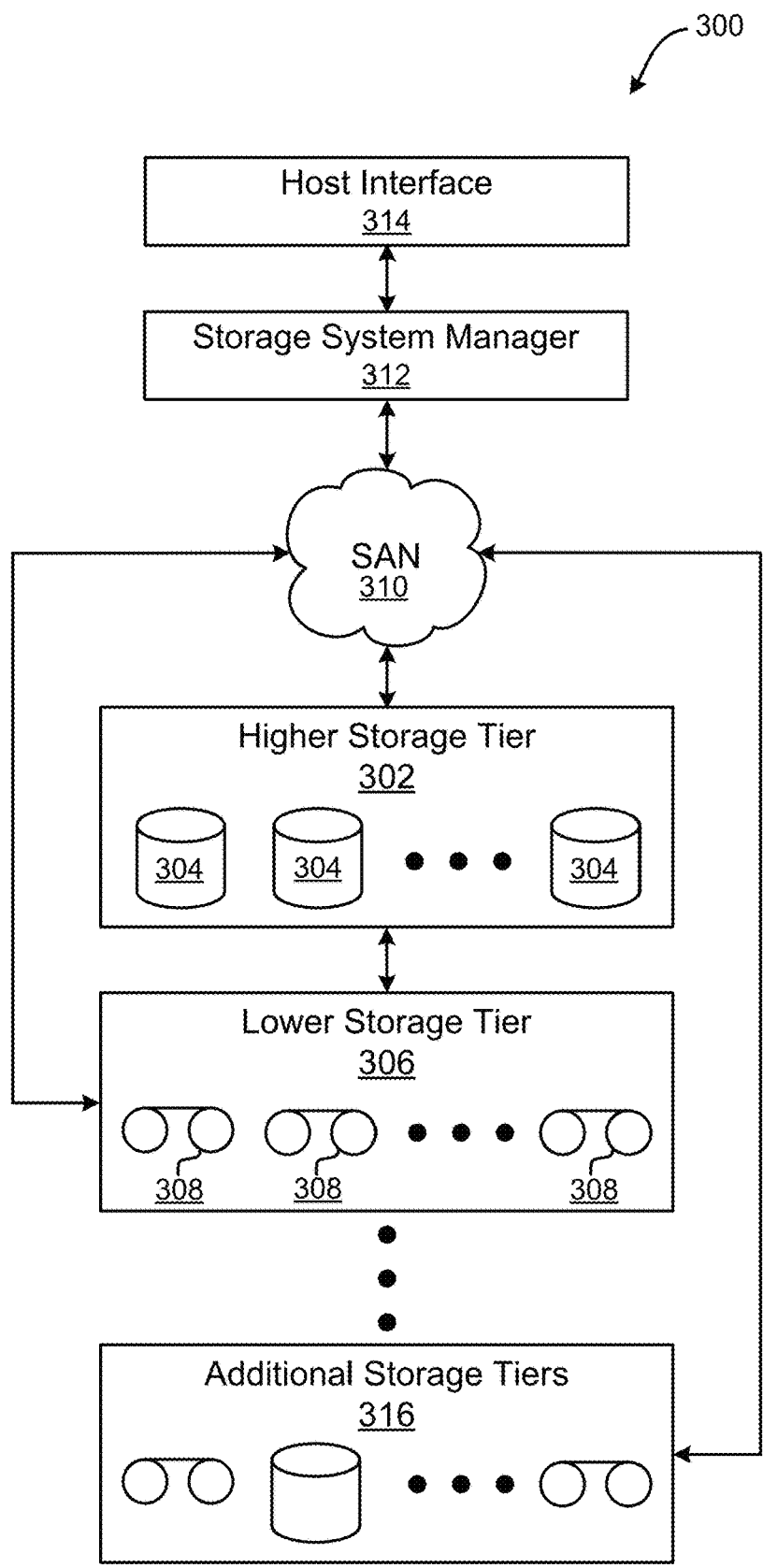
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

With reference now to conventional data storage, in traditional storage systems having deduplication capabilities, as new data is added to the storage system, the new data is compared with existing data within the storage system. If portions of the new data already exist in the storage system, the duplicate data is not written, and only the unique data is stored to storage of the storage system. Pointers may be used in place of a copy of the already-present data so that the new data can be recreated on demand by retrieving the unique data and the existing copy of the data.

In conventional data deduplication, an entire repository structure of a storage system is typically mapped so as to produce metadata for all of the data therein. This data is then queried upon every write that occurs in the system, to allow for duplicate data to be identified. Conventional object based storage systems typically include extensive scaled environments full of data. The idea of generating new metadata for the data that already exists in the system, and then querying it all for every single write event quickly becomes unrealistic, especially in the context of an object storage environment that is to be and/or is in the process of being scaled out.

In one example, assume that a conventional storage system database includes media files (video files, audio files, text files, etc.), and that an audio file is received to also be stored in the storage system. Also assume that the received audio file is a different version of the data that already exists in the storage system database. Accordingly, conventional deduplication of the received audio file with the existing media files of the storage system database includes comparing the audio file not only against the previous versions of the database, but also against all existing media files, e.g., video files in the database, audio files in the database, text files in the database, etc. Such a comparison is extensive and contributes to wasted system resources and wasted time, as in some cases multiple of such comparisons prove unnecessary for/unrelated to the performed data deduplication.

In sharp contrast, various embodiments and approaches herein include grouping of objects within clusters in an object-based storage environment for efficient data deduplication. Specifically, as will become apparent to one skilled in the art upon reading various descriptions herein, each of such clusters include objects having attributes determined to be similar, and thus, in some approaches, deduplication operations for an object are performed locally only against other objects in the cluster to which the object belongs, instead of globally against all of the objects in the data repository.

Figure 4:
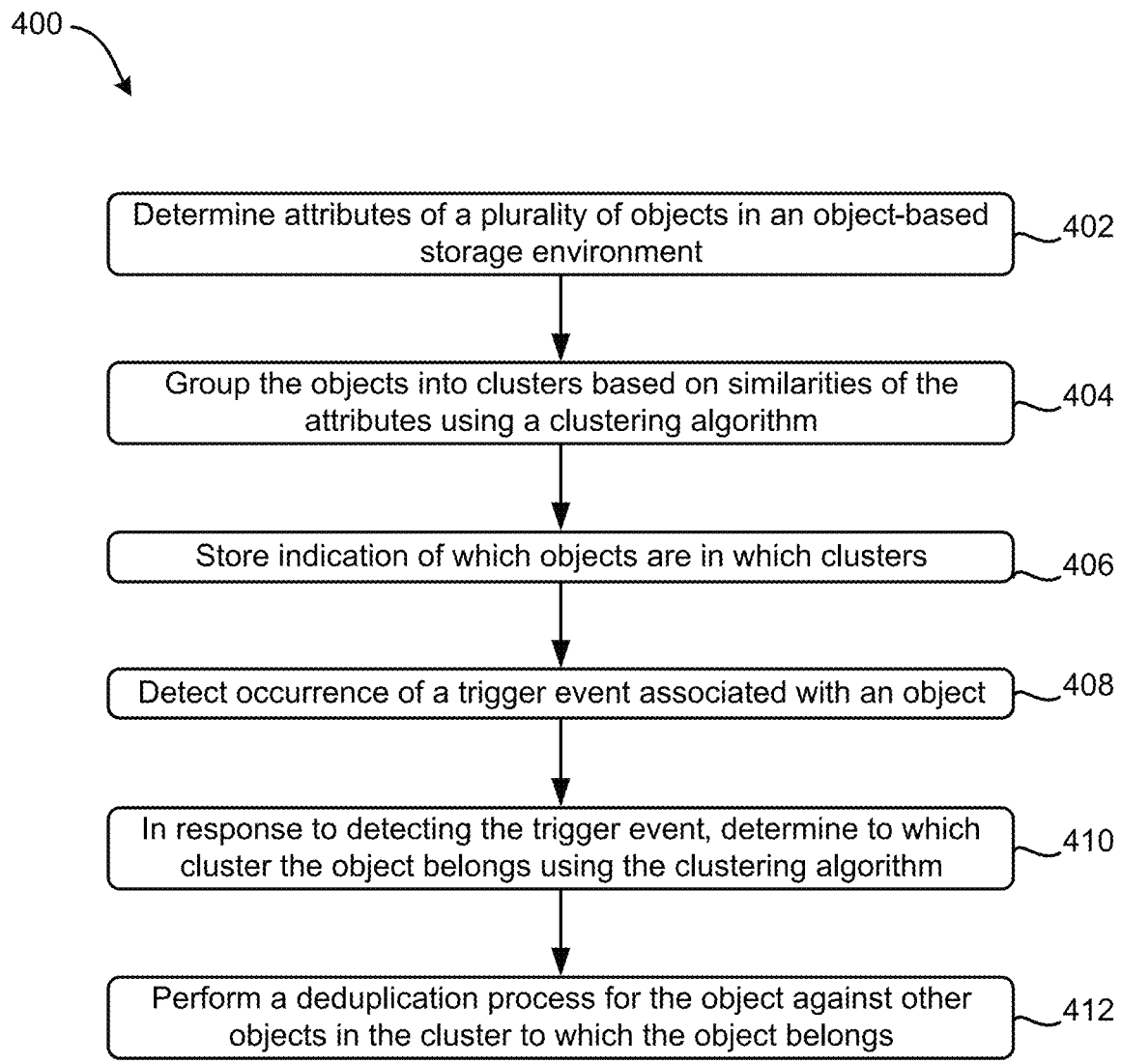
FIG. 4 is a flowchart of a method in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes determining attributes of a plurality of objects in an object-based storage environment. In a preferred approach, determining attributes of the plurality of objects in the object-based storage environment includes scanning all metadata present within object storage data of the objects.

One or more of the objects may already be stored in the object-based storage environment. For example, according to various approaches, one or more of the objects may be already stored on any type of storage module of the storage environment, e.g., cloud storage, magnetic recording tape(s), disc(s), flash memory, etc. In contrast, as will be described in greater detail elsewhere herein, e.g., see FIG. 5, one or more of the objects may be received, e.g., as a new object, by the object-based storage environment, where the new object is not already stored in the object-based storage environment.

According to various approaches, the objects include any one or more types of data having any format. For example, according to various approaches, the objects include any one or more of, e.g., text files, video files, audio files, portions of files, etc.

Moreover, the attributes include any one or more type of attribute of the file and/or object. For example, in one approach, at least one of the attributes include characteristics. According to various approaches, the characteristics include any one or more of, e.g., file type, object type, file name, file size, object size, metadata describing the file and/or object, etc. In another example, at least one of the attributes additionally and/or alternatively include relationships. For example, according to various approaches, the characteristics include any one or more of parent/child relationships, flat relationships, consistency relationships, etc.

The objects are grouped into clusters based on similarities of the attributes using a clustering algorithm, e.g., see operation 404. The clusters may include any number of objects, however an object is preferably not grouped in more than one cluster. Moreover, it should be noted that an object being placed in a cluster does not necessarily mean that the object is being physically stored at a different location among other objects of the same cluster. Instead in some approaches, grouping objects into clusters includes logically associating objects of the same cluster together, e.g., for efficient deduplication processes as will become apparent to one of ordinary skill in the art upon reading various of the descriptions herein.

According to various approaches, the clustering algorithm includes any one or more known types of clustering algorithms. For example, in one approach, the clustering algorithm is a K-means algorithm. In various other approaches, the clustering algorithm additionally and/or alternatively may include, e.g., an algorithm that sorts objects into clusters using the object type and/or name, an algorithm that sorts objects into clusters using the file type and/or name, an algorithm that sorts objects into clusters using metadata associated with the object, an algorithm that sorts objects into clusters based on the storage size by the object, etc.

Operation 406 of method 400 includes storing indication of which objects are in which clusters. Indications of which objects are in which clusters may be stored on any one or more known types and/or locations of memory. For example, according to various approaches, indications of which objects are in which clusters, may be stored on, e.g., any type of physical memory, cloud based memory, long-term and/or short-term memory, etc. In some approaches, the memory to which indication of which objects are in which clusters is the same memory of the object-based storage environment to which one or more of the objects are physically stored. In some approaches, indication of which cluster a particular object is assigned, is stored within information associated with the particular object, e.g., via assigning a tag to the particular object that indicates a cluster to which the object is grouped, via assigning and/or modifying metadata to the particular object that indicates a cluster to which the object is grouped, etc.

In some approaches, the memory to which indication of which objects are in which clusters is not the same memory type and/or location of the object-based storage environment to which one or more of the objects are stored.

Operation 408 of method 400 includes detecting occurrence of a trigger event associated with an object. According to various approaches, the trigger event may include any type of event. In one approach, the trigger event includes detecting modification of the attributes of an object that is already in one of the clusters, e.g., as will be further detailed in FIG. 6. In another approach, the trigger event includes receiving a new object, e.g., as will be further detailed in FIG. 5. In yet another approach, the trigger event includes receiving indication that the object does not belong in a cluster that currently includes the object. In yet another approach, the trigger event includes determining that a cluster is full and cannot receive the object, e.g., the cluster already includes a predetermined threshold number of objects and adding the object therein would compromise a deduplication ratio associated with the cluster.

In response to detecting the trigger event, the clustering algorithm is used to determine to which cluster the object belongs. See operation 410.

In some approaches, where the object is not already grouped in a cluster, e.g., where the trigger event includes receiving the new object, the new object is assigned to a cluster to which the clustering algorithm determines the new object belongs.

In some other approaches, the object may already be grouped in a cluster, e.g., the trigger event includes detecting modification of the attributes of an object that is already in one of the clusters. In one of such approaches, in response to determining that the object belongs to a different cluster, the object is grouped into the different cluster. In a more specific approach, determining that the object belongs to a different cluster is based at least in part on a determination that the attributes of the object as modified are more similar to attributes of at least one object of another cluster, e.g., as determined by the clustering algorithm.

In another approach, in response to determining that the object belongs in the same cluster as it was in during occurrence of the trigger event, the object is not grouped to a different cluster. In a more specific approach, a determination that the object belongs in the same cluster as it was in during occurrence of the trigger event is based at least in part on a determination that the modified attributes of the object are most similar to attributes of at least one object of the same cluster as the object was in during occurrence of the trigger event.

Operation 412 of method 400 includes performing a deduplication process of a type known in the art, with the exception that deduplication is performed for the object against other objects in the cluster to which the object belongs. Performing a deduplication process for the object against other objects in the cluster to which the object belongs mitigates processing that would have otherwise been unnecessarily consumed in performing the deduplication process for the object against all of the objects in the object-based storage environment. As a result, deduplication is not performed against other objects and/or clusters that a detected trigger event does not impact. To clarify, in one approach, a cluster and objects grouped therein "not being impacted" includes clusters that are not changed as a result of the trigger event. Accordingly, depending on the collective size of objects stored in the object-based storage environment, this reduction in deduplication being performed potentially results in improved system performance, e.g., via less extensive deduplication processing being performed, via less querying being performed, etc. Accordingly, method 400 provides more efficient deduplication ratios than is otherwise available in conventional storage systems which perform global deduplication on objects against all objects in the conventional storage system.

Moreover, note that because the deduplication process is performed for the object against other similar objects in the cluster, e.g., those having similar attributes, the resulting deduplication process will be further refined. This is because performing deduplication processes for an object against various other non-similar objects would consume a greater amount of processing and/or time, and moreover would also result in diminished deduplication ratios.

The above-described benefits provided by method 400 are particularly useful when scaling out data storage systems. This is because despite the number of objects in a data storage system increasing with system scale out, deduplication ratios will not be negatively impacted. More specifically, this occurs because deduplication operations of method 400 are preferably not performed across the global object based storage system, provided that at least two clusters are present. Instead, as described in various embodiments and/or approaches herein, deduplication of each object is selectively performed locally against other objects grouped in the same cluster as the object.

According to various approaches, deduplication processes of method 400 may be performed at any time. For example, in one approach, the deduplication process is performed for the object against other objects in the cluster to which the object belongs, in response the object being grouped to the cluster.

According to some other approaches, the deduplication is performed in response to a trigger event. For example, reference is made again to the above approach in which, in response to determining that the object belongs to a different cluster, the object is grouped into the different cluster. In response to the object being grouped into the different cluster, in one approach, method 400 includes performing a deduplication process for the object against other objects in the different cluster. Moreover, in response to grouping the object to the different cluster and/or in response to performing the deduplication process, method 400 preferably includes storing, e.g., updating, indication of which objects are in which clusters.

In some approaches, in response to the object being grouped into the different cluster, an optional operation of method 400 includes performing deduplication on objects of the now previous cluster (that the object was most previously grouped in), e.g., to reflect the updated contents of the cluster.

In another example, reference will now be made to the above approach in which it is determined that the object belongs in the same cluster as it was in during occurrence of the trigger event. In such an approach, method 400 includes performing a deduplication process for the object against other objects in the same cluster. Such a deduplication ensures that updates to objects of the cluster are recorded. Similarly to various other approaches described herein, this selective deduplication preserves processing potential within the object-based storage environment, by selectively not performing a deduplication process for the object against other objects of other clusters that were not changed by the occurrence of the trigger event.

Various examples of object grouping in an object based storage environment will now be described below, e.g., see FIGS. 5-6.

Figure 5:
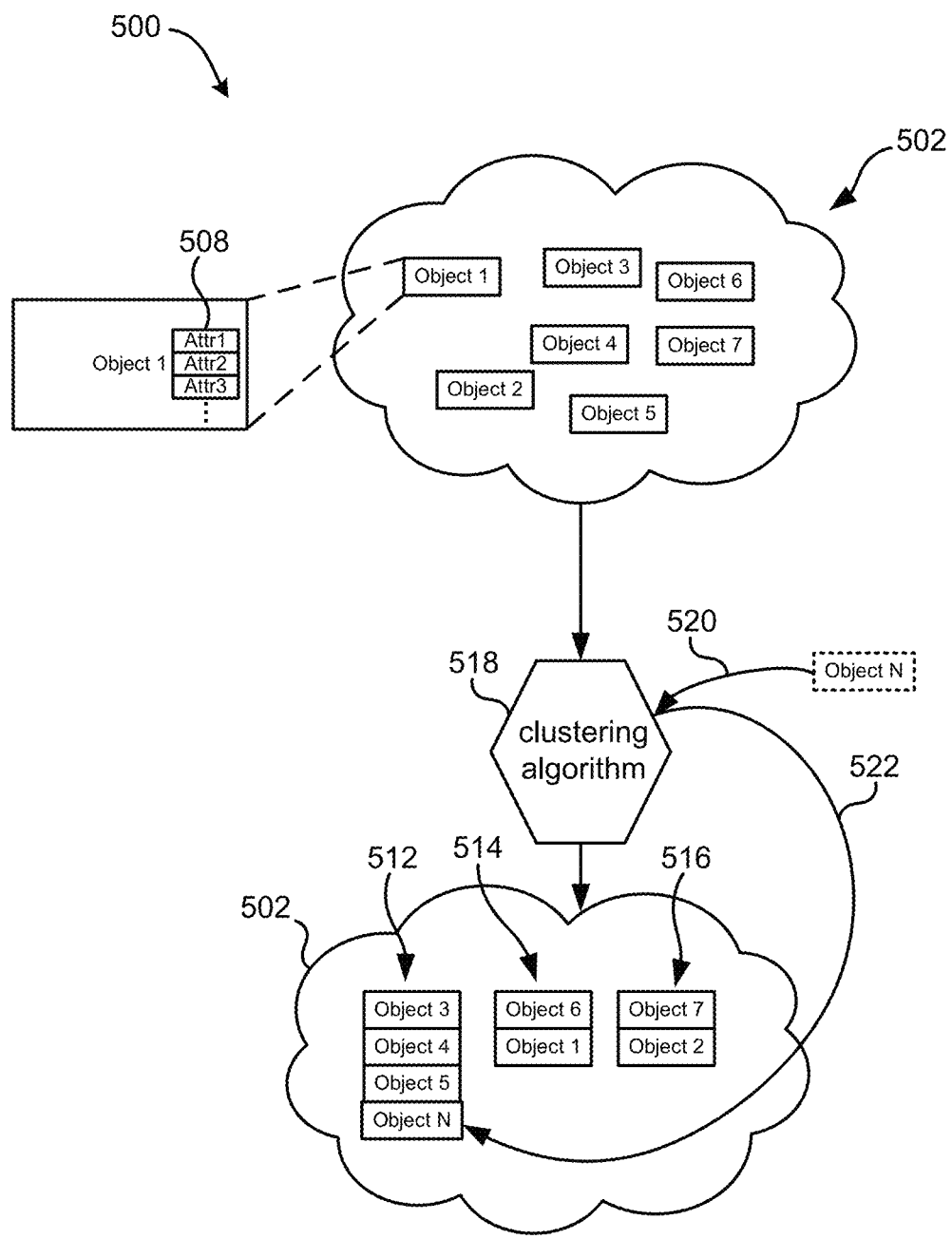
FIG. 5 is a representational diagram of a process for clustering objects in an object-based storage environment in accordance with one embodiment.
Figure 6:
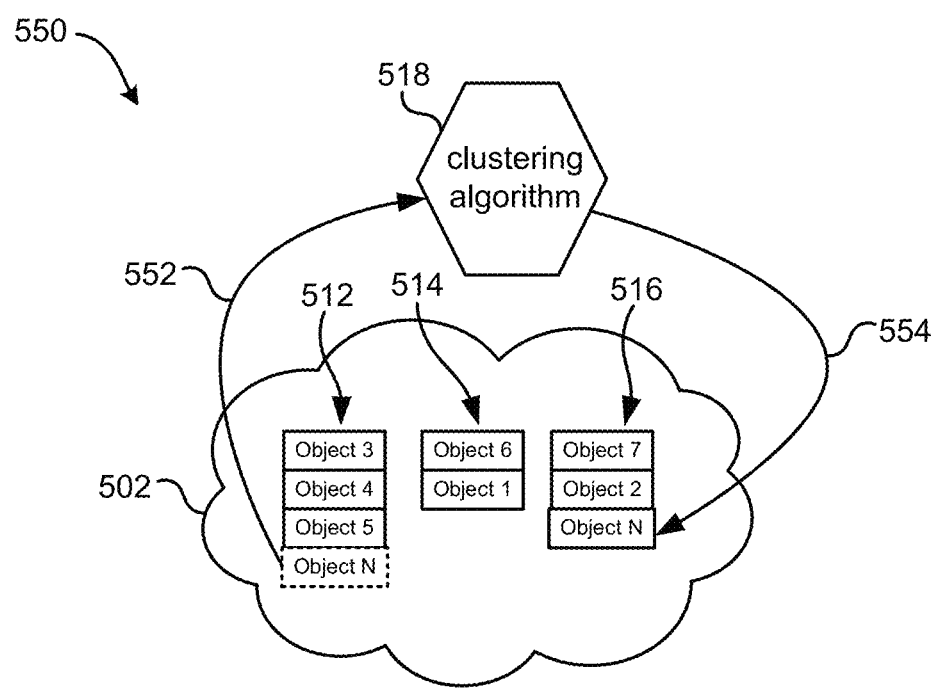
FIG. 6 is a representational diagram of a process for clustering objects in an object-based storage environment in accordance with one embodiment.

FIGS. 5-6 depict representational diagrams of processes 500, 550 for clustering objects in an object-based storage environment, in accordance with various embodiments. As an option, the present processes 500, 550 may be implemented in conjunction with features from any other embodiment listed herein, such as those described with reference to the other FIGS. Of course, however, such processes 500, 550 and others presented herein may be used in various applications and/or in permutations which may or may not be specifically described in the illustrative embodiments listed herein. Further, the processes 500, 550 presented herein may be used in any desired environment.

Referring first to FIG. 5, a process 500 for clustering objects is shown for an object-based storage environment 502 already having a plurality of objects Object 1-Object 7 stored therein. Note that the object-based storage environment 502 does not include cluster groupings for objects Object 1-Object 7 at first.

Attributes 508 of the plurality of objects Object 1-Object 7 are determined. The objects Object 1-Object 7 are grouped into logical clusters 512, 514, 516 based on similarities of the attributes 508 using a clustering algorithm 518. The lower representation of the object-based storage environment 502 illustrates the objects logically grouped into clusters.

Upon detecting occurrence of a trigger event associated with an object, additional operations may be performed. For example, assume the trigger event includes receiving a new object, e.g., see Object N. In response to detecting the trigger event, a determination is made as to which cluster 512, 514, 516 the Object N belongs using the clustering algorithm 518, e.g., represented by Object N entering into processing of the clustering algorithm 518 along logical path 520.

Based on the determination made using the clustering algorithm 518, the Object N is grouped into the determined cluster 512, represented by Object N being grouped to the cluster 512 along logical path 522. In various approaches, the determination made using the clustering algorithm 518 is based at least in part on one or more previous determinations of attributes of other objects. Accordingly, incorporation of past determinations of attributes into the grouping of an object, such as Object N, into the determined cluster 512 is a "prediction phase" of the object-based storage environment 502.

It should be noted that the dashed perimeter of Object N represents a previous logical location of the Object N, e.g., when the Object N was not grouped in any of the clusters 512, 514, 516. Moreover, the non-dashed perimeter of the Object N represents a present logical location of the Object N, e.g., grouped in the cluster 512.

A deduplication process may be performed for any object against other objects in the respective cluster 512, 514, 516 to which the object belongs. For example, in one approach, a deduplication process is performed for the Object N against other objects, e.g., Object 3, Object 4, Object 5, in the cluster to which Object N belongs, e.g., cluster 512. Accordingly, based on the groupings of the objects in the clusters, the deduplication process is not performed for the Object N against other objects in the clusters that the Object N is not grouped in, e.g., Object 6, Object 1, Object 7, and Object 2, of clusters 514, 516. Instead, processing that would have otherwise been unnecessarily expended (unnecessary for purposes of reflecting the logical addition of the Object N into the cluster 512) in performing a global deduplication is preserved.

Referring now to FIG. 6, the process 550 is performed on the object-based storage environment 502 of FIG. 5, after Object N has been grouped in cluster 512.

The process 550 includes a detecting occurrence of a trigger event associated with an object. For example, in the present approach, the trigger event includes a detecting a modification to the attributes of the Object N. In response to detecting the trigger event, a determination is made as to which cluster 512, 514, 516 the Object N belongs using the clustering algorithm 518, e.g., represented by Object N entering into processing of the clustering algorithm 518 along logical path 552.

In the present approach, in response to determining that the Object N belongs to a different cluster, the Object N is grouped into the different cluster, e.g., represented by Object N being grouped to cluster 516 along logical path 554. Moreover, in some preferred approaches, a deduplication process is performed for the Object N against the other objects (Object 7 and Object 2) in the different cluster 516. In such approaches, based on the groupings of the objects in clusters, the deduplication process is preferably not performed for the Object N against other objects in the clusters that the Object N is not grouped in, e.g., Object 6, Object 1, Object 3, Object 4, and Object 5, of clusters 512, 514.

Instead, processing that would have otherwise been unnecessarily expended (unnecessary for purposes of reflecting the logical regrouping of the Object N into the cluster 516) in performing a global deduplication is preserved.

However, it should be noted that in some approaches, deduplication is additionally and/or alternatively performed on objects of the now previous cluster (that the object was most previously grouped in), e.g., Object 3-Object 5 of cluster 512. Note that in such approaches, processing would still be preserved in selectively not performing deduplication against objects of cluster 514.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    determining, by a computing device, attributes of a plurality of objects in an object-based storage environment,
    wherein the attributes include flat relationships and/or consistency relationships;
    grouping, by the computing device, the objects into clusters based on similarities of the attributes using a clustering algorithm, wherein each of the objects is not grouped in more than one of the clusters;
    storing, by the computing device, indication of which objects are in which clusters;
    detecting, by the computing device, occurrence of a first trigger event associated with an object that is in one of the clusters, wherein the first trigger event includes detection of modification of the attributes of the object;
    in response to detecting the occurrence of the first trigger event, determining, by the computing device, to which cluster the object belongs using the clustering algorithm;
    in response to determining that, as a result of the modification of the attributes of the object, the object belongs to a different cluster than the cluster indicated in the stored indication for that object, grouping, by the computing device, the object into the different cluster, and performing, by the computing device, a deduplication process for the object against other objects in the different cluster; and
    in response to determining that, as a result of the modification of the attributes of the object, the object belongs in the same cluster as the cluster indicated in the stored indication for that object, performing, by the computing device, the deduplication process for the object against other objects in the same cluster.

2. The computer-implemented method of claim 1, wherein the indication of which objects are in which clusters is stored at a first location of the object-based storage environment that is different than a second location at which the object is stored, wherein the indication is stored to a first type of memory at the first location and the object is stored to a second type of memory at the second location, wherein the first type of memory and the second type of memory are different types of memory.

3. The computer-implemented method of claim 1, wherein a second trigger event includes receipt of a new object.

4. The computer-implemented method of claim 1, wherein the clustering algorithm is a K-means algorithm.

5. The computer-implemented method of claim 1, wherein determining the attributes of the plurality of objects in the object-based storage environment includes scanning all metadata present within object storage data of the plurality of objects.

6. A computer program product, the computer program product comprising a computer readable storage medium having program instructions embodied therewith, the program instructions readable and/or executable by a computer to cause the computer to perform a method comprising:
    determining, by the computer, attributes of a plurality of objects in an object-based storage environment, wherein the attributes include flat relationships and/or consistency relationships;
    grouping, by the computer, using a clustering algorithm, the objects into clusters based on similarities of the attributes using a clustering algorithm, wherein the clustering algorithm is a K means algorithm;
    storing, by the computer, indication of which objects are in which clusters;
    receiving, by the computer, a new object that is not already stored in the object-based storage environment;
    determining, by the computer, using the clustering algorithm, that the new object belongs in a first of the clusters;
    detecting, by the computer, occurrence of a trigger event associated with the new object, wherein the trigger event includes a determination that the first cluster already includes a predetermined threshold number of objects and adding the new object to the first cluster would compromise a deduplication ratio associated with the first cluster;
    in response to detecting the trigger event, determining, by the computer, using a clustering algorithm, a second cluster to which the new object belongs based on similarities of the attributes; and
    performing, by the computer, a deduplication process for the new object against other objects in the second cluster.

7. The computer program product of claim 6, wherein the attributes include characteristics selected from the group consisting of: file type, file name, file size, object type, object size, and metadata, wherein the clustering algorithm is a K-means algorithm.

8. The computer program product of claim 6, the program instructions readable and/or executable by the computer to cause the computer to perform the method comprising:
in response to determining that the new object belongs to a second cluster, grouping the new object into the second cluster.

9. A system, comprising:
a processor;
hardware-based memory coupled to the processor; and
logic integrated with the processor, executable by the processor, or integrated with and executable by the processor, the logic being configured to:
determine attributes of a plurality of objects in an object-based storage environment;
group the objects into clusters based on similarities of the attributes using a clustering algorithm,
wherein each of the objects is not grouped in more than one of the clusters,
wherein the attributes include flat relationships and/or consistency relationships;
store indication of which objects are in which clusters;
detect occurrence of a first trigger event associated with an object, wherein the first trigger event includes receipt of the object;
in response to detecting the first trigger event, grouping the object into a first of the clusters, wherein the clustering algorithm is used to determine that the object belongs in the first cluster;
perform a deduplication process for the object against other objects in the first cluster;
detect occurrence of a second trigger event associated with the object, wherein the second trigger event includes a determination that the object belongs in a second of the clusters;
in response to detecting the second trigger event, grouping the object into the second cluster; and
perform the deduplication process for the object against other objects in the second cluster.

10. The system of claim 9, wherein the object is not deduplicated against other objects in other clusters that are not changed as a result of the trigger events.

11. The system of claim 9, wherein the indication of which objects are in which clusters is stored to a different memory location of the object-based storage environment than a memory location to which the object is stored.

12. The system of claim 9, the logic being configured to:
detect occurrence of a third trigger event associated with the object, wherein the third trigger event includes detection of modification of the attributes of the object;
in response to a determination that, as a result of the modification of the attributes of the object, the object belongs to a different cluster than the cluster indicated in the stored indication for that object, group the object into the different cluster, and perform a deduplication process for the object against other objects in the different cluster; and
in response to a determination that, as a result of the modification of the attributes of the object, the object belongs in the same cluster as the cluster indicated in the stored indication for that object, perform the deduplication process for the object against other objects in the same cluster.

13. The system of claim 12, wherein the indication of which objects are in which clusters is stored at a first location of the object-based storage environment that is different than a second location at which the object is stored, wherein the indication is stored to a first type of memory at the first location and the object is stored to a second type of memory at the second location, wherein the first type of memory and the second type of memory are different types of memory.

14. The system of claim 13, wherein the clustering algorithm is a K-means algorithm.

15. The system of claim 14, wherein the first type of memory is a cloud-based memory.

* * * * *